UNITED STATES PATENT OFFICE.

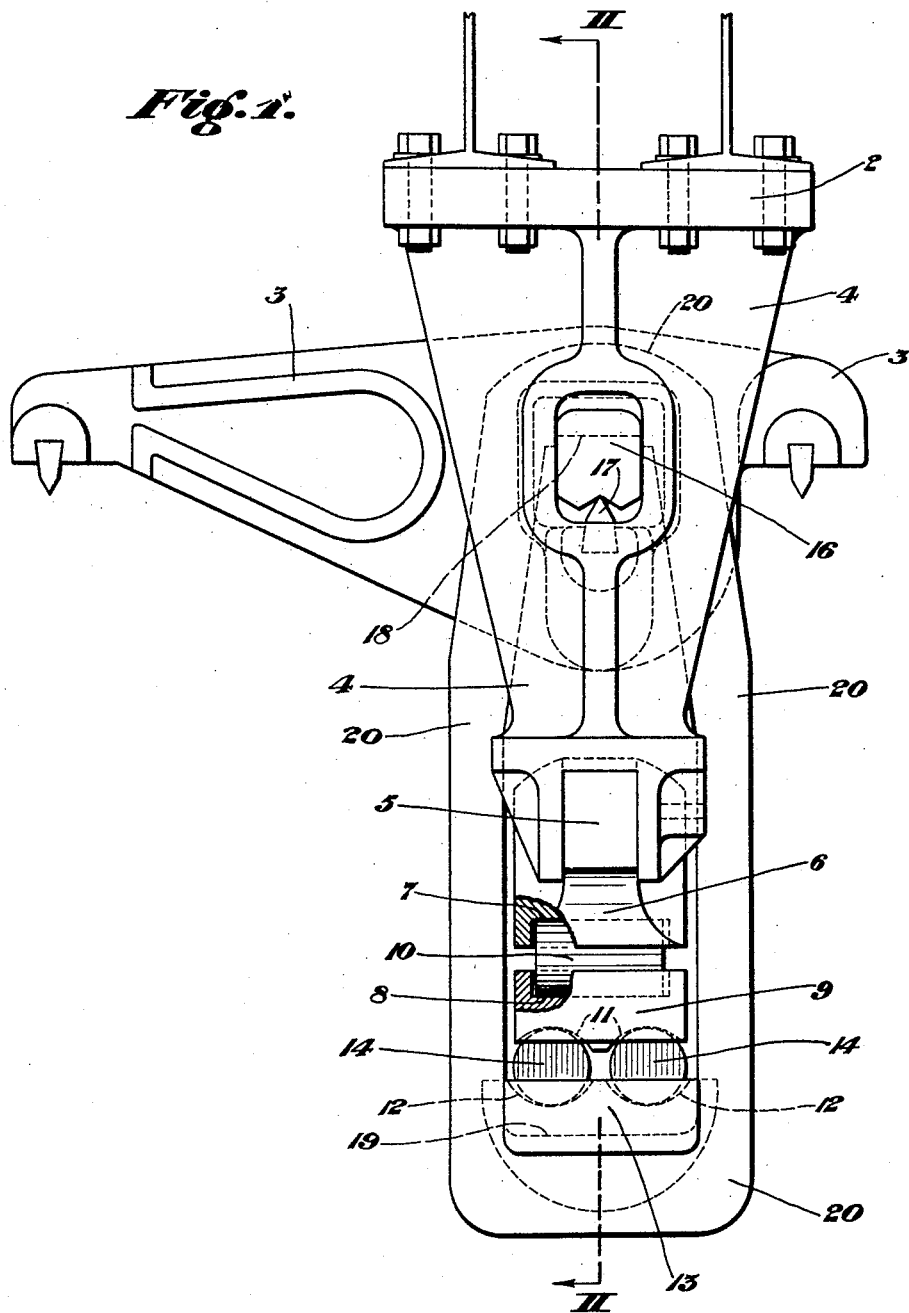

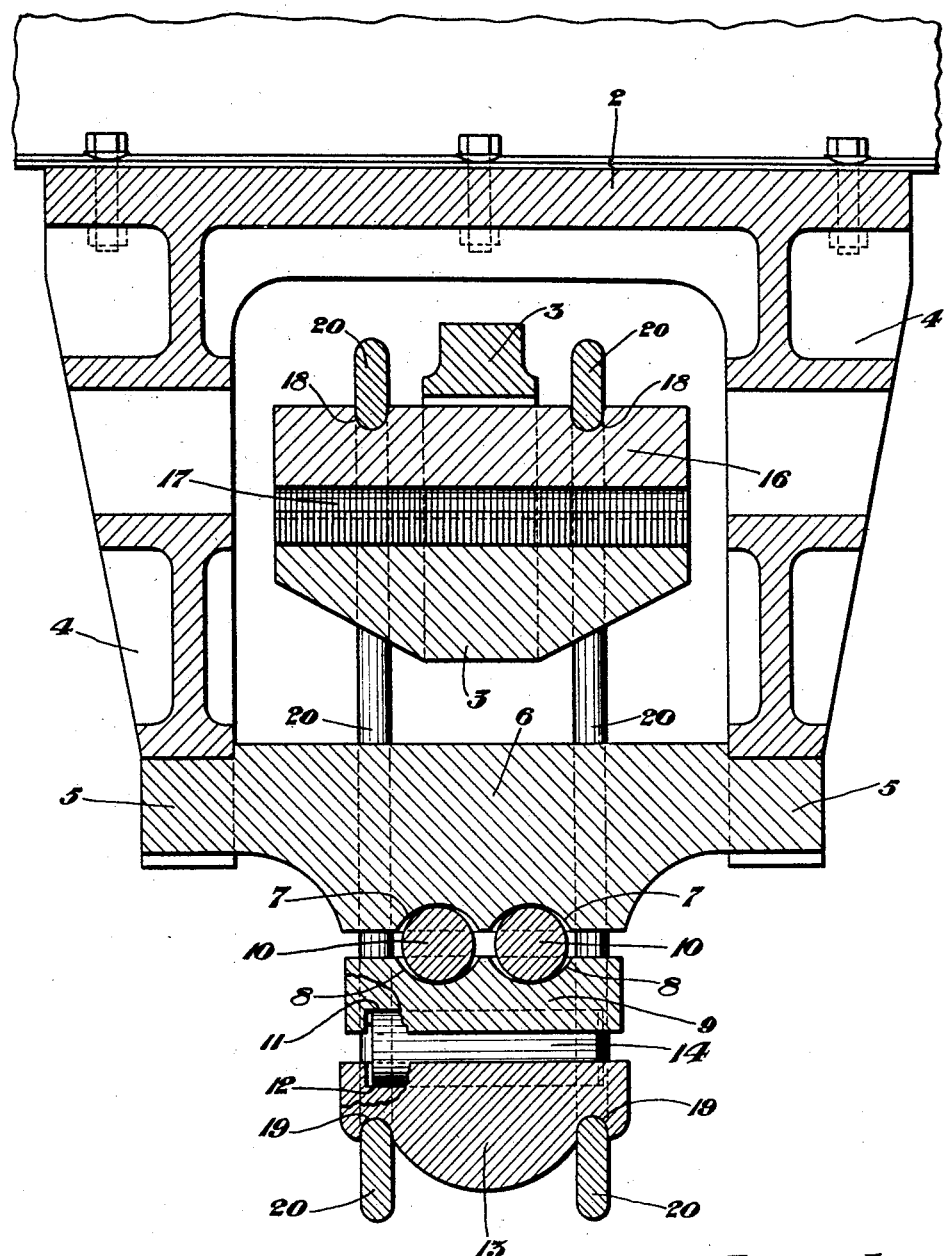

ROY A. McCUNE, OF EAST PITTSBURGH, PENNSYLVANIA.

SUSPENSION-BEARING.

1,398,138.  Specification of Letters Patent.  Patented Nov. 22, 1921.

Application filed January 15, 1921. Serial No. 437,399.

*To all whom it may concern:*

Be it known that I, ROY A. MCCUNE, a citizen of the United States, and resident of East Pittsburgh, in the county of Allegheny and State of Pennsylvania, have invented certain new and useful Improvements in Suspension-Bearings, of which the following is a specification.

This invention relates to certain new and useful improvements in weighing scales of the platform type, and relates particularly to improvements in the suspension bearings for such scales.

One object of the present invention is to provide means for suspending the platform from the main levers in such a manner that the suspension means will have a two-way tilting movement in order to allow the suspension means to move with the platform so as to compensate for the end or side thrust caused by a vehicle or other movable object passing onto or off of the platform.

Another object is to provide a suspension bearing that will be simple in construction, durable, and cheap to manufacture, and one that will not require any tools to assemble, all parts being interfitting, and interlocking.

Other objects and advantages of the invention will be hereinafter set forth in the following specification, and illustrated in the accompanying drawings, in which—

Figure 1 is a side elevation of a portion of a scale, including the load distributer, main lever, equalizer, or connecting block, roller block, load block, rollers, and connecting links, all assembled according to my invention.

Fig. 2 is a sectional elevation on the line II—II of Fig. 1.

Referring particularly to the drawings, the numeral 2 designates the platform supporting member or load distributer as a whole, which straddles the main lever 3 and is provided with bifurcated legs 4, which embrace the machined ends 5 formed on a connecting block or equalizer 6.

The bottom face of the connecting block or equalizer 6 is cut away, forming grooves or roller guideways 7, extending parallel with the main lever and on a line with other grooves or guideways 8 formed in the top face of a roller block 9, and a pair of solid rollers 10 mounted in grooves 7 and 8 between the members 6 and 9.

The bottom face of the roller block 9 is cut away, forming grooves or guideways 11 extending at right angles to the grooves 7 and 8, and on a line with other guideways 12 formed in the top face of a load receiving or base block member 13, and a pair of solid rollers 14 are mounted in the grooves 11 and 12 between the members 9 and 13, their longitudinal axis extending at right angles to the longitudinal axis of the rollers 10.

The diameter of each of the rollers 10 and 14 is the same and is greater than the combined depth of the opposite grooves in which they are mounted, but of less diameter than the width of such grooves; whereby the members 6, 9, and 13 are spaced an appreciable distance one from the other, and permitted to have a rocking or tilting movement toward each other, and a slight transverse movement relative to each other.

The main pivot lever 3 is provided with an aperture at a point within the load distributer, and a saddle block 16 passes through the aperture and is mounted on a knife edge load receiver pivot 17.

The upper face of the saddle block 16 is provided with a pair of grooves 18 in line with a pair of grooves 19 in the bottom face of the load receiving or base block 13, and a pair of locking or suspension links 20 are fitted over the saddle block 16 and load receiving or base block 13, and seated in the grooves 18 and 19, thereby holding the several parts of the structure together.

From the foregoing description, it will be seen that I have provided a novel form of suspension bearing that may be assembled without the use of tools, and one that will compensate for the end or side thrust of the platform.

While I have shown and described a construction which is especially adapted to be used in connection with platform scales, I do not wish to be limited to such use, since various other uses may be found for this construction.

I claim:—

1. In a weighing scale, a load distributer, a main pivot, a connecting block secured across the bottom ends of said load distributer and provided with a pair of grooves on its bottom face, a roller block arranged below said connecting block and provided with a pair of grooves in its upper face on a line with the grooves in said connecting block, and a second pair of grooves in its bottom face extending at right angles to the grooves in its upper face, a pair of rollers mounted in said grooves between said connecting block and said roller block, a load receiving block member arranged below said roller block and provided with a pair of grooves in its upper face in line with the grooves in the bottom face of said roller block, a pair of rollers mounted in said grooves between said roller block and said load receiving block, a main lever passing through said load distributer, a saddle block mounted on said lever, and a pair of links mounted over said saddle block and under said load receiving block to hold all of said parts together.

2. In a weighing scale, a load distributer, a main pivot, a connecting block secured across the bottom ends of said load distributer and provided with a pair of grooves on its bottom face, a roller block arranged below said connecting block and provided with a pair of grooves in its upper face on a line with the grooves in said connecting block, and a second pair of grooves in its bottom face extending at right angles to the grooves in its upper face, a pair of rollers mounted in said grooves between said connecting block and said roller block, a load receiving block member arranged below said roller block and provided with a pair of grooves in its upper face in line with the grooves in the bottom face of said roller block, a pair of rollers mounted in said grooves between said roller block and said load receiving block, said rollers being of less diameter than the width of said grooves, but of sufficient diameter to space said connecting block, roller block and load receiving block apart, thereby permitting said parts to have a tilting or rocking movement toward each other and a transverse movement relative to each other, a main lever passing through said load distributer, a saddle block mounted on said lever, and a pair of links mounted over said saddle block and under said load receiving block to hold all of said parts together.

3. In a weighing scale, the combination with a lever having a horizontal opening formed therein, of a knife edge pivot within said opening, a saddle block bearing mounted upon said knife edge pivot, a pair of link members mounted upon said saddle block, a platform supporting member embracing said lever having bifurcated ends, a connecting block provided with reduced end portions to receive said bifurcated ends, a shackle block mounted against the lower ends of said links, a pair of rollers mounted on said shackle block, a roller block mounted on said rollers, and a second pair of rollers mounted between said roller block and said connecting block and extending at right angles to said first named rollers.

In testimony whereof, I have hereunto signed my name.

ROY A. McCUNE.